United States Patent [19]

Cowell et al.

[11] Patent Number: 5,223,689
[45] Date of Patent: Jun. 29, 1993

[54] PROFILES TO INSURE PROPER HEATING FUNCTION

[75] Inventors: Mark J. Cowell, San Carlos; Thomas H. McGaffigan, Half Moon Bay; James C. Swift, Menlo Park, all of Calif.

[73] Assignee: Metcal, Inc., Menlo Park, Calif.

[21] Appl. No.: 692,987

[22] Filed: Apr. 29, 1991

Related U.S. Application Data

[63] Continuation-in-part of Ser. No. 365,300, Jun. 13, 1989, abandoned.

[51] Int. Cl.$^5$ ............................................. B23K 1/00
[52] U.S. Cl. .................................................. 219/85.22
[58] Field of Search .............. 219/85.12, 85.16, 85.19, 219/85.22, 497, 498, 501

[56] References Cited

U.S. PATENT DOCUMENTS

| | | | |
|---|---|---|---|
| 3,991,297 | 11/1976 | Ammann | 219/85.16 |
| 4,224,744 | 9/1980 | Siegel et al. | 219/85.22 |
| 4,256,945 | 3/1981 | Carter et al. | |
| 4,317,980 | 3/1982 | Goodrich et al. | |
| 4,390,954 | 6/1983 | Manning | |
| 4,580,026 | 4/1986 | Stol | |
| 4,595,816 | 6/1986 | Hall et al. | |
| 4,698,774 | 10/1987 | Abe et al. | |
| 4,720,623 | 1/1988 | DiCesare et al. | 219/501 |
| 4,795,886 | 1/1989 | Carter | |
| 4,814,587 | 3/1989 | Carter | |
| 4,839,501 | 6/1989 | Cowell | |

FOREIGN PATENT DOCUMENTS 62-45469 8/1985 Japan.
144277 8/1987 Japan.

OTHER PUBLICATIONS

"Automatic Laser Inspection System for Solder Joint Integrity Evaluation", Institute for Interconnecting and Packaging Electronic Circuits, Vanzetti, pp. 1–11, May 1984.
"Users Guidelines for Automatic Solder Joint Inspection Systems", Institute for Interconnecting and Packaging Electronic Circuits, Jul. 1986.
"Signature Analysis Unit", Proel Systems USA.

Primary Examiner—Clifford C. Shaw
Attorney, Agent, or Firm—Howard L. Rose

[57] ABSTRACT

A peak power measurement as a function of various system parameters is made to determine completion of a proper heating operation; in one embodiment by measuring peak power delivered to a level as a function of temperature within a specified time period for a specific load; and in another embodiment by the plot of peak power and ramp-up and ramp-down levels as a function of time.

25 Claims, 6 Drawing Sheets

Fig. 1A

Fig. 1B
POWER VS. TEMP.
STTC-037
4 LOADS 10 SEC.

Fig. 4

Fig. 3
POWER VS. TEMP.
SOLDER POT

PROFILES TO INSURE PROPER HEATING FUNCTION

RELATED APPLICATIONS

This application is a continuation-in-part of application Ser. No. 07/365,300, filed on Jun. 13, 1989 in the names of the current inventors, now abandoned.

BACKGROUND OF THE INVENTION

The present invention relates to the use, during a heating operation, of a power measurement to determine when a heating operation has been properly completed, and more particularly to predetermining various parameters of a heating system such that by measuring peak power delivered by an electric heater, relative to some other parameter of the system, the proper completion of a heating operation is determinable.

The present invention is applicable to many different types of heating functions, from industrial heating of metals or the like, to food preparation, soldering irons and the like. In many repetitive operations, it is desirable to insure repeatability without concentrated operator attention.

In the present application of the invention, without intending to be limited thereto, the invention is discussed in terms of a soldering function.

Cold solder joints have been a major source of problems in electrical and electronic systems since the inception of this industry. The problem with cold solder joints has been greatly increased with the advent of chips, since overheating to insure against a cold solder joint may very well damage or destroy expensive and delicate chips. Thus, a technician or operator, particularly one in a high production environment, is often walking a tightrope between underheating and overheating during a soldering operation, both conditions resulting in a defective component or board, some of these boards costing more than one thousand dollars.

BRIEF DESCRIPTION OF THE PRESENT INVENTION

In accordance with the present invention, two different embodiments for insuring a good solder joint, both employing peak power measurement, are disclosed.

Regardless of the specific approach employed, it is intended to provide inspectionless heating with record generation, if desired. The operator or technician is informed that the heating operation has been completed, by a visual and audible signal or a print-out or a computer screen display, or the like. In the present description, computer screen displays are discussed.

In a first embodiment, peak power achieved within a specified length of time indicates that the connection has achieved proper temperature to provide a good solder joint.

Specifically, in this approach it has been predetermined that if a specified peak power has been achieved within a specified time interval, a predetermined temperature required for a good solder joint has been reached. The parameters cited herein are examples only, and they vary with each specified class of loads and must be predetermined.

To determine the parameters for a specific application, a fundamental function is determined, time. The architecture of a board or the like is studied, as well as the physical tolerance to temperature of the components on the board, to determine the maximum safe exposure of various elements to elevated temperatures for the said specified period of time. The temperatures to which an element is exposed vary depending upon location of the elements relative to the source of heat; the soldering iron tip shape and wattage; iron temperature; and the rate of transfer of heat to the junction to be soldered. The next parameter is the heat required to be transferred to provide a proper solder joint, a function of the fusion temperature of the solder and the rate of dissipation of heat from the whole complex.

Once these parameters have been determined, by experimentation and measurement, the peak power required to achieve the desired temperature to provide a proper joint without damage, is determined. Thereafter, the operator must only listen for or look for a signal or display indicating that such peak power and fall-off curve have been achieved.

In the second embodiment of the invention, the overall configuration of a power versus time curve, including the ramp-up and ramp-down regions of the curve, is chosen as determinative of a proper solder joint. Power is supplied to a heater in contact with a connection to be soldered. The flow of solder is observed, and when it is determined that the connection is properly heated and melted, the plot of power versus time is noted. This plot now serves as a characteristic "print" of a completed joint.

The heater employed in this operation must have low thermal inertia and must be essentially isolated from heat sinks or other heat sources. The thermal inertia of the heater must be far less than the items to be heated. Coupling from a source of current to the heater is preferably inductive to further reduce thermal inertia.

The soldering irons used in developing the concepts of the present invention and which were employed in developing the curves and data presented herein are disclosed in U.S. Pat. No. 4,839,501, these irons being temperature self-regulating heaters driven by constant current, wherein $$\frac{\Delta |I|}{|I|} \leq -\frac{1}{2} \frac{\Delta |R|}{|R|}$$

where $|I|$ is current above and below Curie temperature, and $|R|$ is resistance, also below Curie temperature. The temperature regulation is good if the current remains truly constant and the power equation is $P=KR$ where R decreases as Curie temperature is approached. If the current increases, regulation becomes increasingly poor as the value of the left side of the equation approaches the value of the right side of the equation and regulation is lost if the former value exceeds the latter value. In such a case a runaway condition can develop resulting in destruction of the heater. The soldering iron described in Pat. No. 4,256,945 may also be employed. The descriptions of these two patents, relative to the operation of the heater, are incorporated herein by reference. Other self-regulating heaters may also be employed. The curves developed herein are typical of soldering functions. Other heating systems will have different curves, but curves can be developed for each system and employed as stated herein.

The term "effective Curie temperature" is the temperature at which a material becomes for purposes of this invention essentially paramagnetic. Such temperature may be as little as 1° C. or as much as 100° C. less than absolute Curie temperature depending upon the material employed.

Reference is made to high mu materials or magnetically permeable materials or the magnetic permeability of materials. These materials provide for a high degree of concentration of magnetic flux in them as long as they ar below their effective Curie temperatures. The flux produces eddy current and hysteresis losses as well as resistive losses. Such materials may be ferromagnetic, ferrimagnetic or other materials whose degree of magnetic permeability varies with temperature.

OBJECTS OF THE INVENTION

It is an object of the present invention to develop a profile of net power transferred to a load to be heated, wherein a profile may be established for each heating function, whereby the profile may subsequently be used to determine if the heating function has been correctly performed.

It is another object of the present invention to establish a net power versus temperature relationship, accomplished within a specified length of time, for defining a proper heating cycle for each specific load; this relationship may subsequently be used to determine if a heating function for a specific load has been correctly completed.

It is still another object of the present invention to define a net power versus time relationship for a proper treating cycle for each specific load; this relationship may subsequently be used to determine if a heating function for such specific load has been correctly completed.

Yet another object of the present invention is to provide automatic, inspectionless heating with record generation.

DETAILED DESCRIPTION OF THE PRESENT INVENTION

There are certain assumptions that are made in the following description of the first embodiment of the invention described below:

1. A quality solder connection, that does not damage the devices or products being soldered, is a connection that has been increased in temperature to 450°-500° F. in not more than five seconds.

2. The 450°-500° F. connection temperature must be maintained for 0.5 second.

3. The area of the soldering iron tip on the surface of the connection region must be maintained constant for all like operations.

4. The tip surface has been properly tinned and maintained.

5. The temperature gradient across the connection will be considered insignificant (not always true).

Heat is initially delivered to a solder connection based on the temperature differential between the tip and the solder connection. When a hot soldering tip comes in contact with a solder connection, the temperature of the tip decreases as the solder connection temperature increases. When the minimum heater temperature is achieved, the power will be at a maximum. As the heater temperature increases the power decreases. The connection temperature is dependent upon the heater temperature at this phase in the cycle of operation, because of steady state heat transfer.

Figures 1A, 1B:
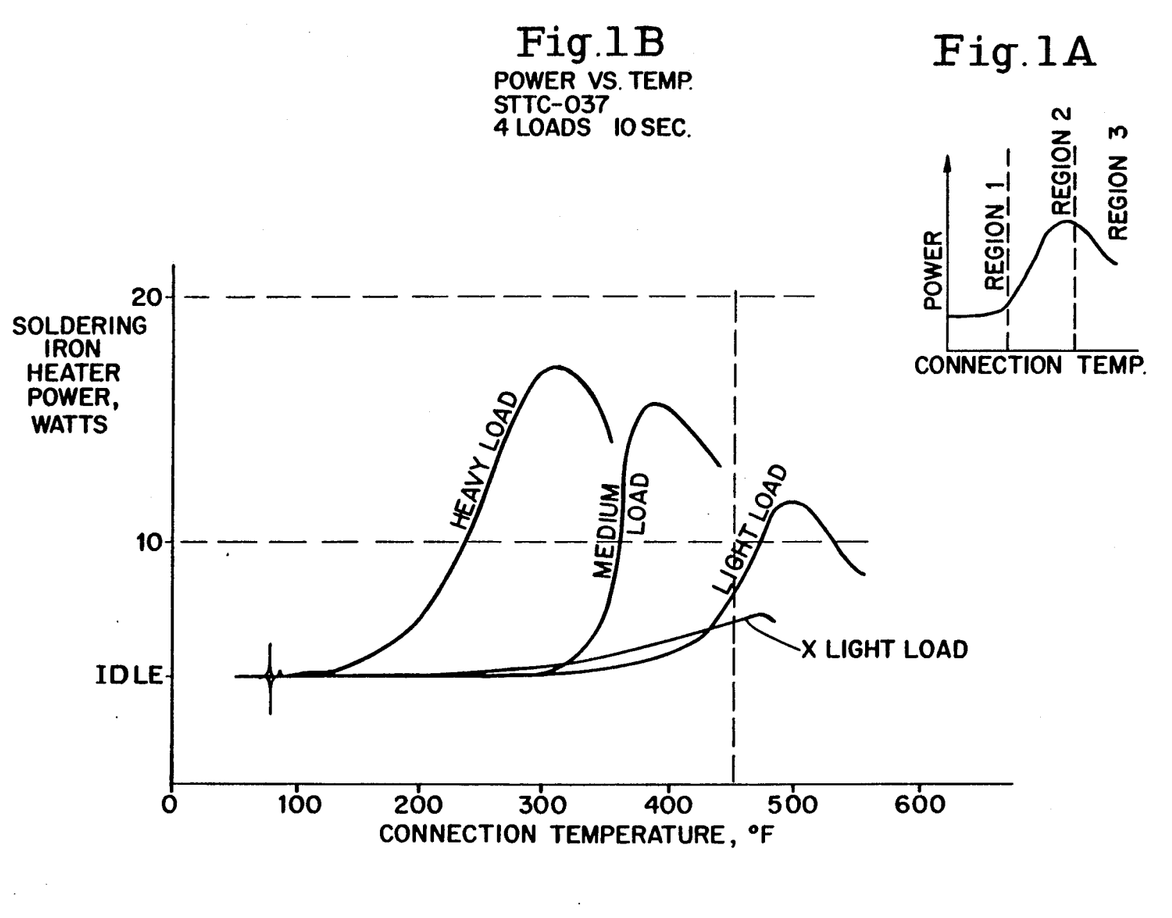
FIGS. 1A and 1B are graphs of a proper net power versus relationship.
Figure 2:
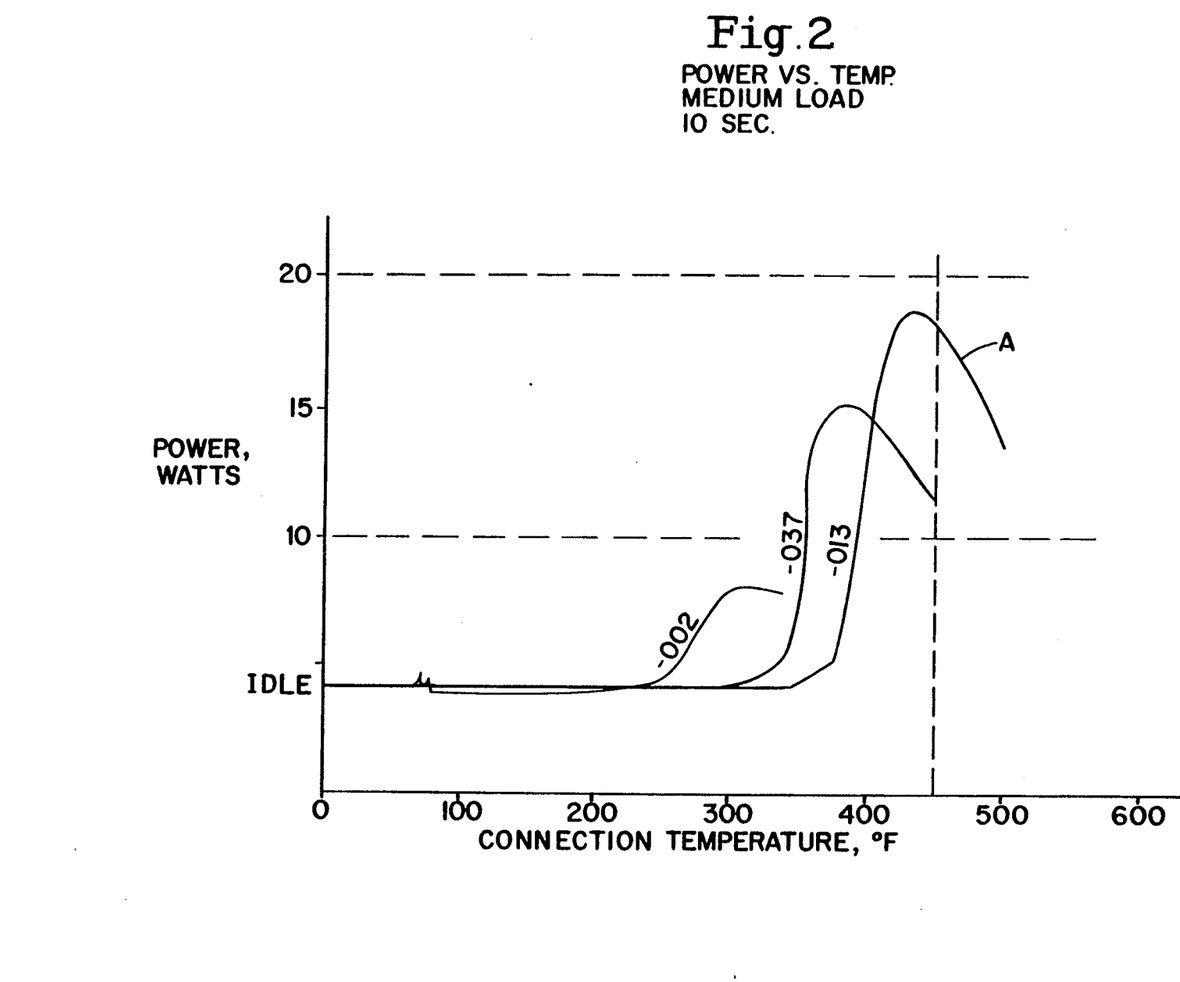
FIG. 2 is a graph depicting effect of load size on the power/connection temperature curve.

Considering the graphs of FIGS. 1A and 1B and FIG. 2, it is noted that the power curves all have the same basic shape. Initially, the power curve is a horizontal line, representing constant power. The power then increases, reaches a peak, and declines to some level between a peak and the horizontal line. This characteristic curve occurs when the same tip cartridge is used with different thermal loads as in FIGS. 1. It also occurs when different tip cartridges are used with the same thermal load as in FIG. 2. We can use this power curve to predict the proper temperature of a solder connection.

Referring now specifically to FIG. 1A of the accompanying drawings, it is noted that three phases or regions of heat transfer occur during the formation of a solder connection. The first region is termed STORED HEAT. During this phase of forming a solder connection, all the heat is supplied by the stored heat of the tip. The tip temperature decreases, but the power is unchanged because the heater temperature has not decreased. This phase occurs rapidly, definitely complete in less than a second. Temperature control of the solder connection is not possible in this region because the heater has not responded to the thermal load. Since it is desired to have the heater respond to the load, Region 1 should be minimized by reducing the thermal inertia of the tip. The second region, TRANSIENT HEATING, starts once the heater temperature decreases in response to the thermal load. Power increases rapidly to a peak and the connection temperature continues to increase, though slower than in the first region. Heat is supplied to the connection by the heater, as well as some contribution from stored energy, due to the tip temperature's further decline. Temperature control of the solder connection is improved, because a portion of the heat is provided by the heater, but still requires operator judgment. The third region, STEADY STATE HEATING, is the most interesting because the connection temperature can be predicted from the net power. During this phase, the net power is decreasing as the connection temperature increases. The connection temperature continues to increase but slowly. Heat is supplied to the connection from the heater and not through the stored heat of the tip.

Since the connection temperature increase obeys the laws of steady state heat transfer, the connection temperature is related to the power in the following manner:

$$(\text{heater temperature} - \text{connection temperature}) = \text{net power} \times \text{thermal resistance}$$

If a temperature self-regulating heater is employed, such as disclosed in U.S. Pat. Nos. 4,256,965, 4,745,264 and others of the same general characteristics, and particularly those assigned to the same assignee as the present invention, the lowering of temperature during Region 1 causes the temperature of the ferromagnetic material to fall below effective Curie temperature, so that increasing power is supplied to the heater.

FIG. 1B shows the effect of load size on the power/connection temperature curve. For any given tip configuration, increasing the load increases the peak power and decreases the peak power temperature. Solder connections formed on the heavy and medium load were not quality connections. In neither instance was the desired temperature range achieved during the ten second test. The light load also did not produce a quality connection, since the peak power occurred after the desired temperature had been reached, indicating an over-powered iron that raises temperature beyond safe limits. Region 3 heating did not occur while the connection temperature was between 450°-500° F.

In the graphs of FIG. 2, the thermal load, or solder connection is the same, but the configuration of the tip is different. This figure shows that a larger and/or shorter tip (curve −013), increases peak power and increases the peak power temperature. Only the connection formed by the curve designed −013 could be considered a quality connection. The connection temperature of 450° F. occurred in Region 3 and just beyond the peak power. The other two connections were unacceptable. The connection represented by curve −002 never achieved a 450° F. temperature, and the connection represented by curve −037 took too long, ten seconds, to achieve the minimum temperature. All three curves were created with 35 watt heaters and were taken over the same time interval, ten seconds, as indicated already.

Figures 3, 4:
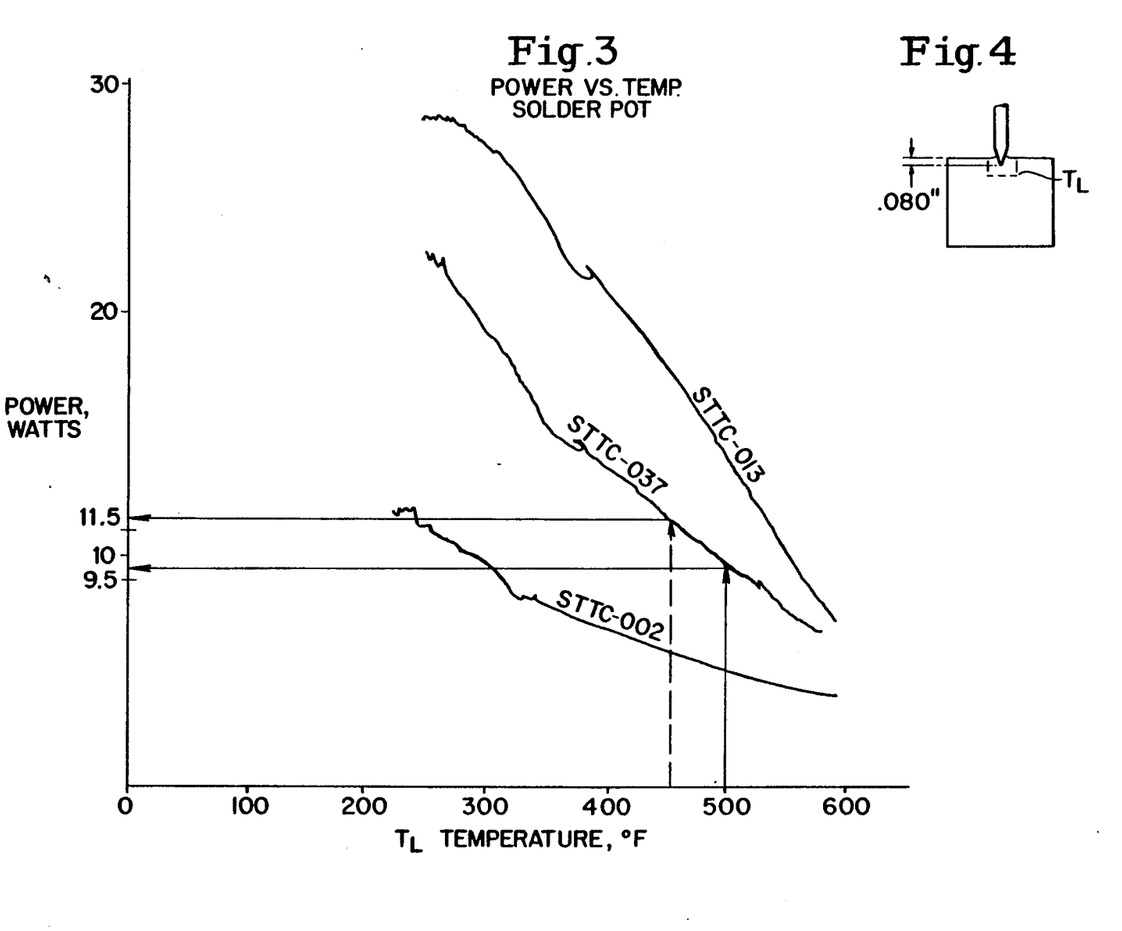
FIG. 3 sets forth in graph form the results of a solder pot load test on three different cartridges of the same wattage.
FIG. 4 illustrates a solder pot.

A solder pot, see FIG. 4, which represents an infinite load, is employed in the tests illustrated in FIG. 3, and comprises a temperature-controlled container with solder. Tests were conducted by placing the soldering iron tip in the molten solder and allowing the solder temperature to cool slowly. The solder pot load test allows characterization of the power of a cartridge when its tip, is at different temperatures ($T_L$). The solder pot test allows one to predict the desired peak powers required for quality solder connections using different tip configurations. The output power versus temperature variation is due to the thermal resistance of the tip.

The lower the thermal resistance (short and large tips), the steeper the curve. FIG. 3 shows the results of the solder pot load test for three different cartridges of the same wattage, but different tip configurations. Since this is also steady state heat transfer, the output power indicates the connection temperature and the formation of a quality solder connection. Again, a quality connection is formed at a temperature between 450°-500° F. For the 037 cartridge, the output power corresponding to this temperature range is 11.5 to 9.5 watts. When using an 013 tip cartridge the desired power, of 9.5 to 11.5 watts could not be achieved. If the peak power exceeds 11.5 watts, a quality connection has been performed only if the power decreases to 11.5 in less than five seconds.

Figure 5:
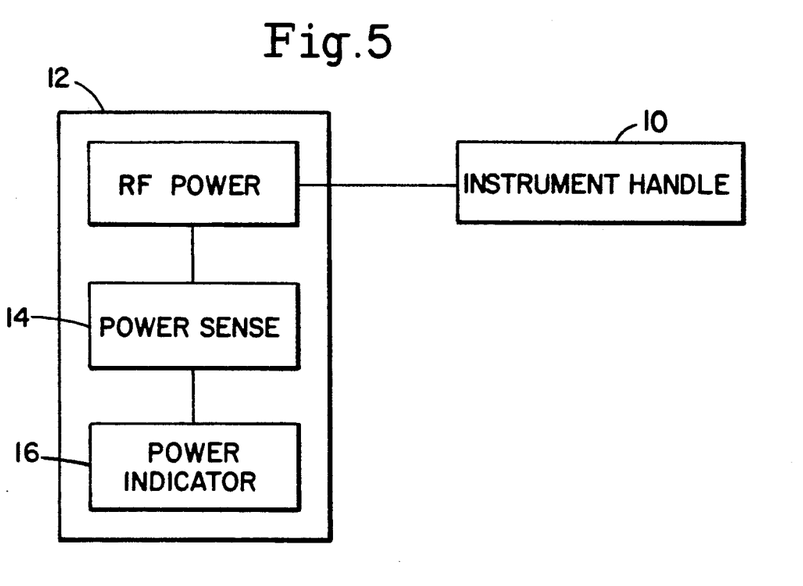
FIG. 5 is a block diagram of a soldering iron control system based on the present invention.

Referring now to FIG. 5 of the accompanying drawings, there is illustrated a block diagram of a soldering iron control system based on the first embodiment of the present invention. A soldering iron 10, designated in the drawing as an instrument handle, is provided with r.f. power by an RFG-30 power supply 12, which includes a power sensor 14. Sensor 14 senses the power supplied to iron 10, and provides a d.c. signal to a peak power indicator 16. When proper peak power is indicated within the five-second window, the solder connection has been completed and the operation is to be terminated. Termination may be by the operator, or in a fully automated system, by the equipment. The power to the heater is to be maintained for a period after peak power is reached. Thus, in an automated system, the peak power meter has a delay before shut-off which depends upon the system configuration. It has been found that, in most instances, a half-second delay is sufficient, but an adjustment is provided to permit the delay to be varied.

The heater employed in the present invention must have a temperature control mechanism which prevents a temperature rise above a predetermined temperature, and it must be operated in conjunction with a net power meter. When these constraints are observed, the concepts of the present invention are applicable. The temperature regulation, in accordance with the patents cited above, is by Curie point control; wherein when a heater is near its effective Curie temperature, it is idling, but as soon as its temperature falls, produces increasing heat energy.

Peak power indicator 16 may be a bell, a whistle, an oscilloscope for displaying the net power versus temperature curve occurring over the five-second interval, a chart recorder, or a computer that analyzes the function and provides a print-out, whereby a permanent record of each operation is available.

In the above embodiment of the invention, the time of the heating operation is fixed, and the net power versus temperature curve is plotted. Specifically, the net power is observed throughout the five-second window, and, if a power variation as illustrated in FIG. 1 is achieved, a quality solder joint is achieved.

In another approach, a net power versus time profile is employed. Again, the heater is a self-regulating type of low thermal inertia relative to the load. Again, as in the prior embodiment, temperature is measured only during calibration of the system, but not during actual operation. Also, as before, the heater size and available range must be matched to the load. Further, in a soldering operation, the quantity of solder can be employed to optimize temperature exchange in the heater, to improve response time.

Figure 6:
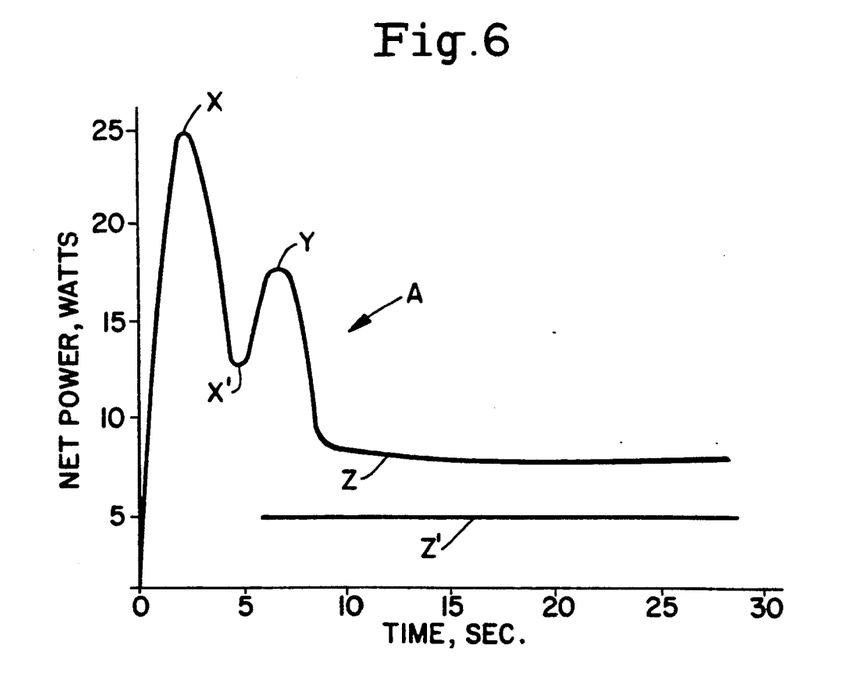
FIG. 6 is a graph which illustrates a satisfactory curves of a soldering in accordance with a second embodiment of the present invention.
Figure 7:
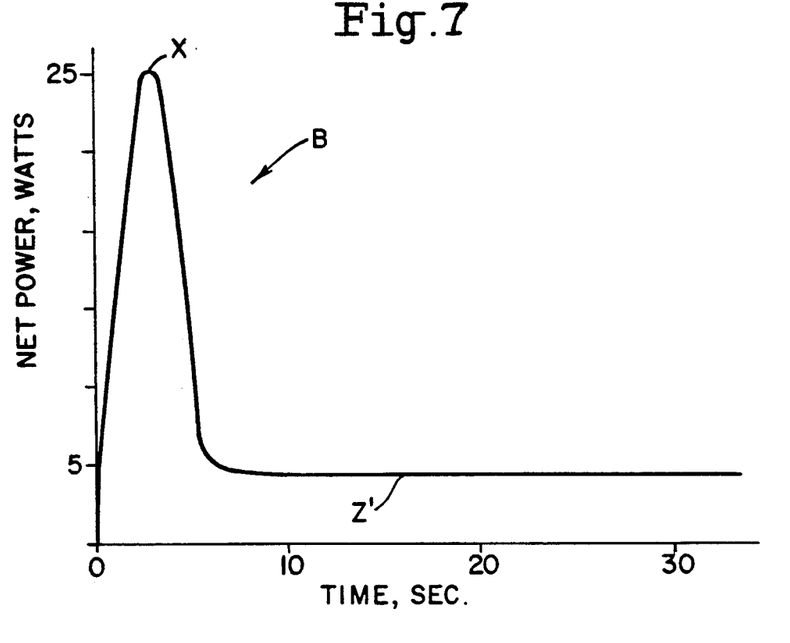
FIGS. 7 and 8 are graphs illustrating unsatisfactory curves of a soldering operation.

Referring to the graphs of FIGS. 6 and 7, a profile is illustrated for a situation where a wire is soldered to a connection. In the curve, the heater power rises within a specified time to maximum at point X, at which time, the Curie temperature is reached and the power being delivered to the load falls off to a low point, X'. A second peak, point Y, which must also occur within a specified time, results from the solder melting, spreading out, wetting the heater and transferring heat from the heater to the connection, which reduces the heater temperature thus drawing power up to point Y. After all elements have been brought up to the regulation temperature and soldered together the heater once again self regulates but now the thermal load is greater, thus the net power required to maintain the self-regulation temperature is higher. If, as in FIG. 6, the idle power is above, no load line Z', the connection has been completed properly. If as in FIG. 7 the idle power is below line Z' the connection has not been made.

Referring to FIG. 7, the curve illustrates a bad solder connection. As the heater is energized the power curve rises to peak power at X but second peak Y is missing, indicating that solder has not been melted. This failure indicates that no solder is present or the solder has not wetted the heater. Also, the line Z falls to about the no-load line, indicating little or no heat transfer to the load indicating the heater is not thermally in contact with the load (wire).

Figure 8:
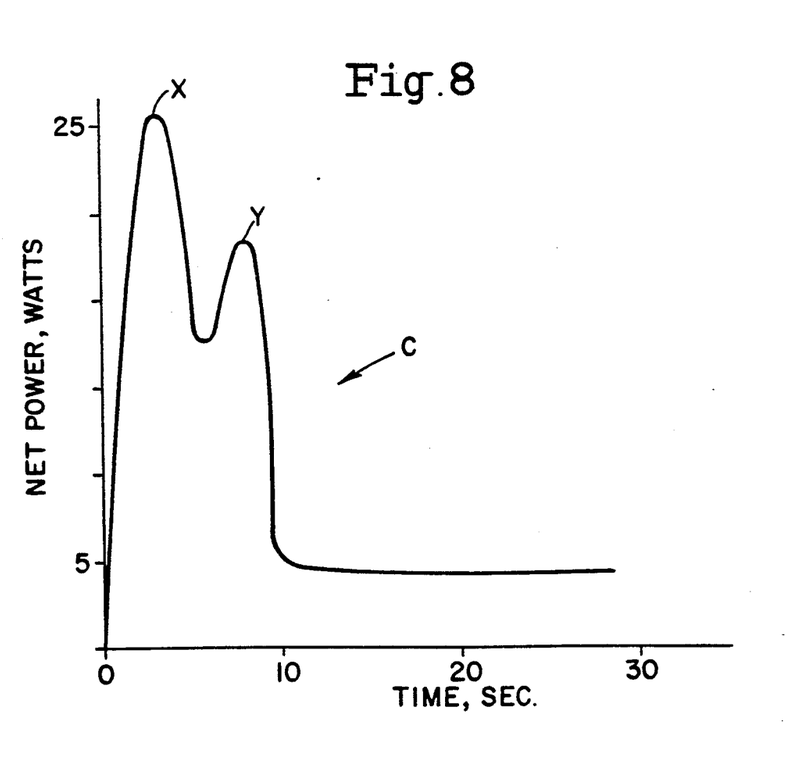

Referring to FIG. 8, the curve illustrates a condition where points X and Y are obtained but the power falls to a level below the proper termination steady state load line, indicating no member was connected, such as a wire, or little if any wetting by the solder to the members to be soldered occurred.

The term "net power" is employed herein to indicate the power actually delivered to the load. The power supply employed in these tests is a constant current supply operating at 13.56 MHz. A directional coupler was employed to determine net power, and in the time tests, a chart recorder was employed.

Figure 9:
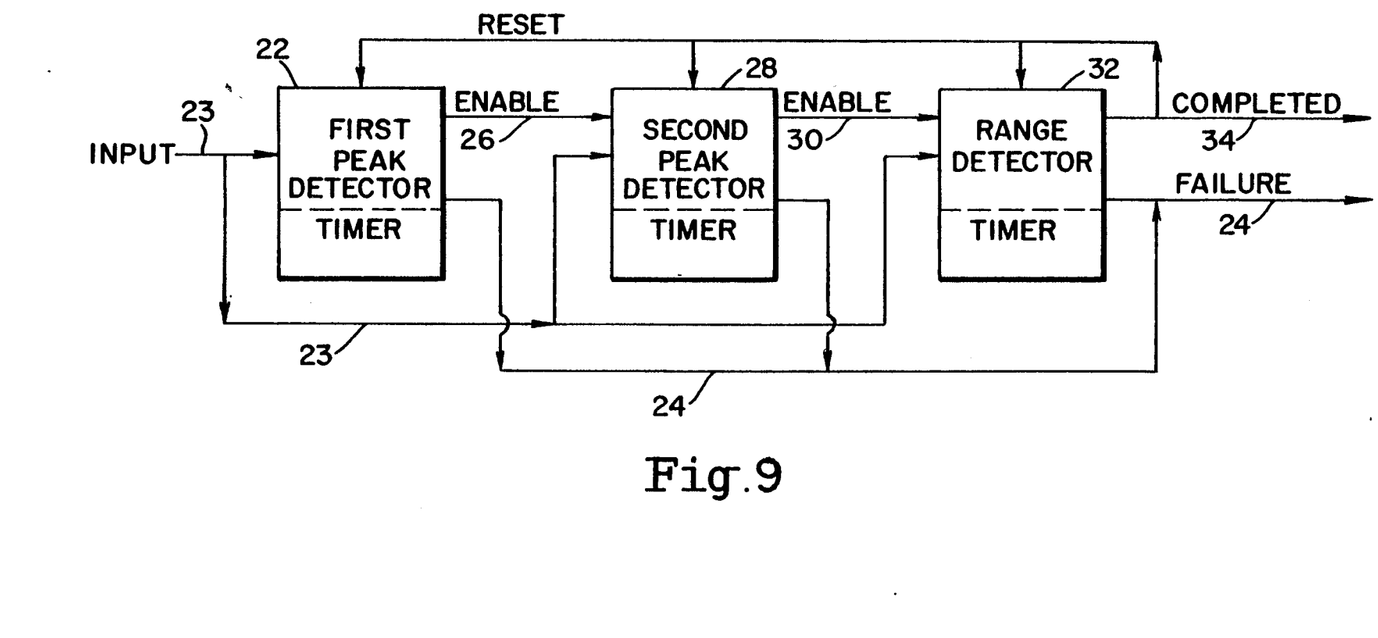
FIG. 9 is a block diagram of a circuit for automatically detecting satisfactory and unsatisfactory operations.

In the second embodiment of the invention, a plot of a chart recorder or the like may be employed to observe operation. In the alternative, automatic operation may be achieved by measuring the two peaks X and Y, and the amplitude of the Z region. Such a system is illustrated in FIG. 9.

A first peak detector-timer 22 receives an input from lead 23 indicating net power delivered to the load. A net power meter may be employed for this purpose. Upon receipt of a signal at a quite low level, a timer is triggered and if the net power does not rise to the level X of FIG. 6 within a specified time, say three seconds, a failure signal is applied to a lead 24. If the peak is reached within the specified time a signal appears on lead 26 and enables a second peak detector 28 to receive the input signal on lead 23 and starts its timer. If the second peak is reached within about four seconds after enablement of the timer of the second detector 28, an enable signal appears on lead 30. If the peak is not reached within the specified time signal again appears on lead 24.

If a signal does appear on lead 30, the timer of a range detector 32 is enabled and the detector 32 receives the input signal. If the input signal falls to within a range specified by the range detector, a level as approximated by the load line Z' within the specified time, about five seconds after enablement, then a signal appears on "completed" lead 34, otherwise the signal appears on the failure lead 24. If the signal does appear on lead 34 it is employed over lead 36 to reset the system. The signal on lead 24 may be employed to sound an alarm or provide some other indication of failure.

Thus, by observing the plot of power versus time, as set forth in FIG. 8, a good or bad solder joint is readily determined.

Once given the above disclosure, many other features, modifications and improvements are thus to be considered a part of this invention, the scope of which is to be determined by the following claims.

We claim:

1. The method of determining the completion of a proper heating operation, comprising the steps of:
   determining peak net power input to a specific heater as a required function of system parameters required to produce a proper heating operation in a specific load,
   initiating a heating operation,
   measuring net power and determining occurrence of the peak net power as a function of the desired system parameters, and
   terminating the heating operation as a function of detecting peak net power required to achieve the desired heating action.

2. The method of claim 1, wherein the desired heating action is a specific configuration of peak net power occurring within a specified interval.

3. The method of claim 1, wherein the desired heating action is peak net power level occurring within a specified length of time.

4. The method of claim 1, wherein the desired function includes two net power peaks for second level falling to a final level above a predetermined level.

5. The method of claim 1, wherein the net power delivered to a load must rise to a desired maximum within a specified time interval.

6. The method of claim 1, wherein the net power must rise to a first peak, decline, rise to a second peak, and fall to a net power level above a specified net power level.

7. Apparatus for determining the completion of a proper heating operation, comprising:
   means determining peak net power input to a heater as a function of a system parameter required to produce a proper solder connection,
   means initiating a heating operation,
   means measuring power and determining occurrence of the peak power as a function of the system parameter, and
   means terminating the heating operation as a function of detecting peak net power as the desired function of the system parameter.

8. Apparatus for determining the completion of a desired heating function, comprising:
   a source of power,
   means for establishing a net power function that indicates that heating has been properly achieved,
   means for establishing a function related to net power transferred to a load, and
   means comparing said functions to determine if said net power function has been achieved.

9. The method of insuring a proper heating operation, comprising:
   developing net power and net power variations required to perform a proper heating operation by initially measuring the thermal characteristics of a specific load, the thermal inertia of the heater, the area of contact between heater and load, mass of the heater, and time and temperature requirements,
   initiating a heating operation,
   measuring net power characteristics, and
   comparing such net power characteristics as a function of time.

10. The method of determining the completion of a proper soldering operation, comprising the steps of:
    determining peak power input to a heater as a function of a system parameter required to produce a proper solder connection,
    initiating a soldering operation,
    measuring power and determining occurrence of the peak power as a function of the system parameter, and terminating the soldering operation as a function of detecting peak power as the desired function of the system parameter.

11. The method of claim 10, wherein the desired function is a specific configuration of a graph of peak power versus time.

12. The method of claim 10, wherein the desired function is a peak power level.

13. Apparatus for determining the completion of a proper soldering operation, comprising:
    means determining peak power input to a heater as a function of a system parameter required to produce a proper solder connection,
    means initiating a soldering operation,
    means measuring power and determining occurrence of the peak power as a function of the system parameter, and
    means terminating the soldering operation as a function of detecting peak power as the desired function of the system parameter.

14. The method of determining the completion of a proper heating operation, comprising the steps of:
    determining a peak of net power input to a specific heater as a required function of system parameters required to produce a proper heating operation in a specific load,
    initiating a heating operation,
    measuring net power and determining occurrence of a peak of net power as a function of the desired system parameters, and
    terminating the heating operation as a function of detecting a peak of net power required to achieve the desired heating action.

15. The method of claim 14, wherein the desired heating action is a specific configuration of a peak of net power occurring within a specified interval.

16. The method of claim 14, wherein the desired heating action is a peak of net power level occurring within a specified length of time.

17. The method of claim 14, wherein the desired function includes two net power peaks and a final level above a predetermined level.

18. The method of claim 14, wherein the net power delivered to a load rises to a desired maximum within a specified time interval.

19. The method of claim 14, wherein the net power rises to a first peak, declines, rises to a second peak, and falls to a net power level above a specified net power level.

20. Apparatus for determining the completion of a proper heating operation, comprising:
    means determining a peak of net power input to a heater as a function of a system parameter required to produce a proper solder connection,
    means initiating a heating operation,
    means measuring power and determining occurrence of a peak of net power as a function of the system parameter, and
    means terminating the heating operation as a function of detecting a peak of net power as the desired function of the system parameter.

21. Apparatus for determining the completion of a desired heating function, comprising:
    a source of power,
    means for establishing a net power function that indicates that heating has been properly achieved,
    means for establishing a function related to net power transferred to a load, and
    means comparing said functions to determine if said net power function has been achieved.

22. The method of verifying conformance of a heating operation of an article to a standard, comprising:
    developing net power and net power variations required to perform a proper heating operation by initially measuring the thermal characteristics of a specific load, the thermal inertia of the heater, the area of contact between heater and load, the mass of the heater, and time and temperature requirements,
    initiating a heating operation,
    measuring net power characteristics,
    comparing such net power characteristics as a function of time with a standard, and
    testing during the heating function to accept as properly heated articles, those which have been subjected to a heating function conforming with said standard.

23. The method of determining the completion of a proper heating operation comprising the steps of
    determining the tolerance to temperature of elements adjacent a region to be heated,
    determining the rate of flow of heat from the region to be heated to various adjacent elements,
    determining the temperature to which it is desired to heat a load to be heated,
    determining the rate of transfer of heat to the load,
    determining the power required to achieve proper heating of the load without damaging adjacent elements,
    applying such power to the load and determining if the results of the said determination have been achieved.

24. The method according to claim 23 including applying energy at a predetermined rate until desired temperature is achieved.

25. The method according to claim 23 wherein a peak power is selected and applied to a load.

* * * * *